June 28, 1966  E. E. BRYANT  3,258,357
METHOD OF PORCELAIN ENAMELING
Filed Dec. 4, 1962  5 Sheets-Sheet 1

INVENTOR.
EUGENE E. BRYANT
BY
ATTORNEY

June 28, 1966   E. E. BRYANT   3,258,357
METHOD OF PORCELAIN ENAMELING
Filed Dec. 4, 1962   5 Sheets-Sheet 5

INVENTOR.
EUGENE E. BRYANT
BY
Milton L. Simmons
ATTORNEY

United States Patent Office 3,258,357
Patented June 28, 1966

3,258,357
METHOD OF PORCELAIN ENAMELING
Eugene E. Bryant, Cleveland, Ohio, assignor to Ferro Corporation, Cleveland, Ohio, a corporation of Ohio
Filed Dec. 4, 1962, Ser. No. 242,232
10 Claims. (Cl. 117—119.2)

This invention deals generally with an apparatus and method for fusing a vitreous coating on a substrate, and deals more particularly with an apparatus and method for eliminating defects in a fused vitreous coating through the relief of internal stresses in a workpiece during the fusion thereon of a vitreous coating.

As is well known, apparatus and methods for porcelain enameling have evolved through various stages from the early periodic box-type furnaces, to the modern U shaped, or straight through, continuous, the latter being perhaps best typified by United States Patent 2,925,260 to Dickey.

The underlying principle of the continuous furnace, and which heretofore has been considered to provide the most ideal firing conditions, has been one characterized by a heating curve, as will be hereinafter described, of both the workpiece on which a vitreous coating is to be fused, as well as the ambient temperature within the furnace, ascending steadily in temperature from about room temperature to fusion temperature, said fusion temperature being maintained fairly constant for a length of time sufficient to fuse a coating on said workpiece, then steadily and evenly dropping the temperature of the vitreous coated workpiece and the ambient temperature of the furnace back to room temperature. Thus, the ideal temperature curve of an enameled workpiece during firing has followed substantially a course of straight line ascension and descension during the heating and cooling cycles respectively.

Prior to the Dickey apparatus, however, although the ambient temperature of a continuous furnace ascended and descended in substantially straight line fashion, all parts of a rather bulky piece of ware, such as a refrigerator liner or bathtub, were not prone to ascend and descend in temperature along precisely the same line. That is, certain, exposed sections of the ware baffled and masked other sections, this causing certain areas of the ware being fired to vary with respect to others as to the rapidity with which they ascended or descended in temperature within the furnace. Thus, while all portions of the ware during firing were ascending and descending in temperature in straight line fashion, the firing curves were not the same for all parts of the ware. Thus, an apron of a sheet steel bathtub might well have undergone an entirely different, and much more severe firing cycle than the interior of the tub immediately adjacent the apron. This, obviously, caused a number of problems. Variable color was experienced due to different firing cycles for various parts of the ware. Substantial bracing was required to alleviate buckling in the ware due to uneven expansion which would promote defects such as hairlining due to stresses within the piece being fired.

The furnace of Dickey partially solved the foregoing problems by utilizing convection currents in the preheat and cooling zones of a continuous furnace to attempt to equalize all parts of ware being fired during heating-up and cooling cycles so that there was thus created a tendency for each portion of the ware being fired to follow substantially the same straight line temperature ascension and descension, respectively, during the heating-up and cooling cycles.

But, while the furnace of Dickey resulted in an improvement over the prior practice, ware fired in his apparatus was still required to follow a straight line ascension and descension temperature curve, during heating and cooling respectively, and I have determined that such straight line ascension and descension is undesirable for a number of reasons.

That is, no matter how accurately we try to control the preheat and cooling cycles of enameled ware during firing there will still be internal stresses set up within the ware during any firing cyce which follows a straight line ascending and descending temperature curve, by virtue of the fact that it is physically impossible to momentarily stabilize every segment of the ware being fired at precisely the same temperature throughout certain critical ranges.

Briefly and simply stated then, I have found that a most radical improvement is achieved in the quality of enameled ware if, during the firing cycle thereof, the entire piece of ware is maintained at a *constant* temperature, within a critical temperature range, during the heating cycle, prior to firing and/or during the cooling cycle, subsequent to firing.

Utilizing this method, I have not only effectively reduced to a minimum buckling, distortion and hairlining of enameled ware with a consequential reduction in rejection scrap, but I have made possible the utilization of "paint type" construction and non-premium grades of steel for use in the enameling operation thereby effecting a substantial economic advantage. Heretofore, a refrigerator exterior which was to be vitreous enameled had to be made of heavier gauge steel with extensive internal bracing, due to the high temperatures encountered, in order to produce an enameled refrigerator exterior without enamel defects, and with a minimum of warpage. If the same refrigerator exterior were to be painted, since the piece was not going to undergo an extensive, severe heat treatment, it could be made of such lighter gauge steel with only minimum bracing required to maintain the shape of the exterior during use. My development now permits such lighter, more economical "paint type" construction to be enameled.

Accordingly, it is an object of this invention to provide an improved method for firing to fushion a vitrified coating on a substrate.

It is yet another object of this invention to provide a method for firing to fusion a vitrified ceramic coating on a substantially continuous basis, whereby, the workpiece to be fired, and the atmosphere in which it is fired, reach a point of stabilized coincidence prior and/or subsequent to a fusion step.

It is also an object of this invention to provide an improved apparatus for firing to fusion a vitreous coating on a workpiece.

It is also an object of this invention to provide an improved vitreous enameled article displaying a minimum of structural and coating defects.

In the attached drawings, FIG. 1 is a plan view of a preferred embodiment of my novel apparatus;

Figure 5:
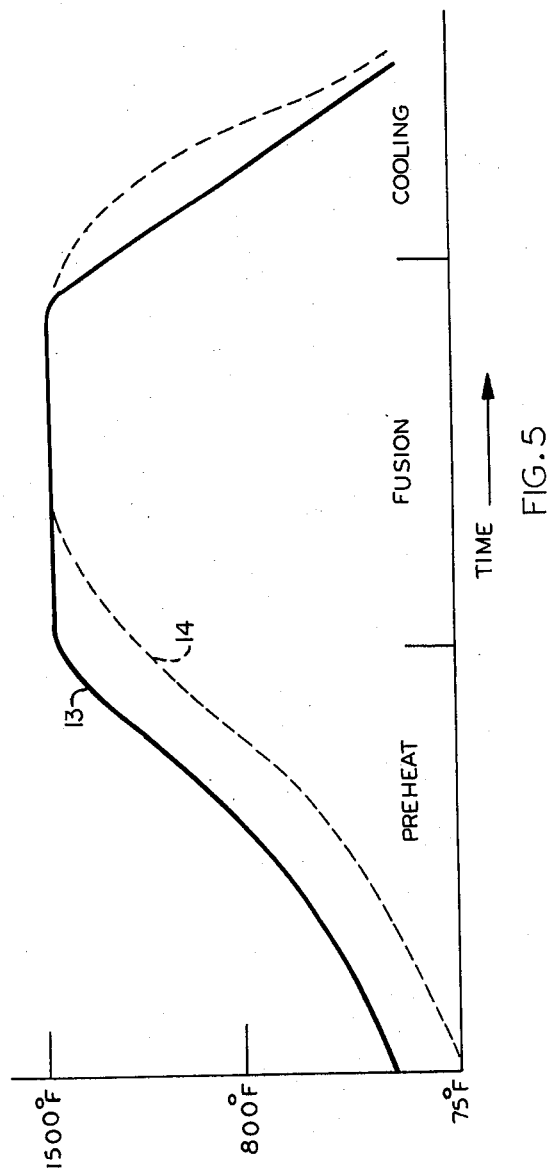
Figure 6:
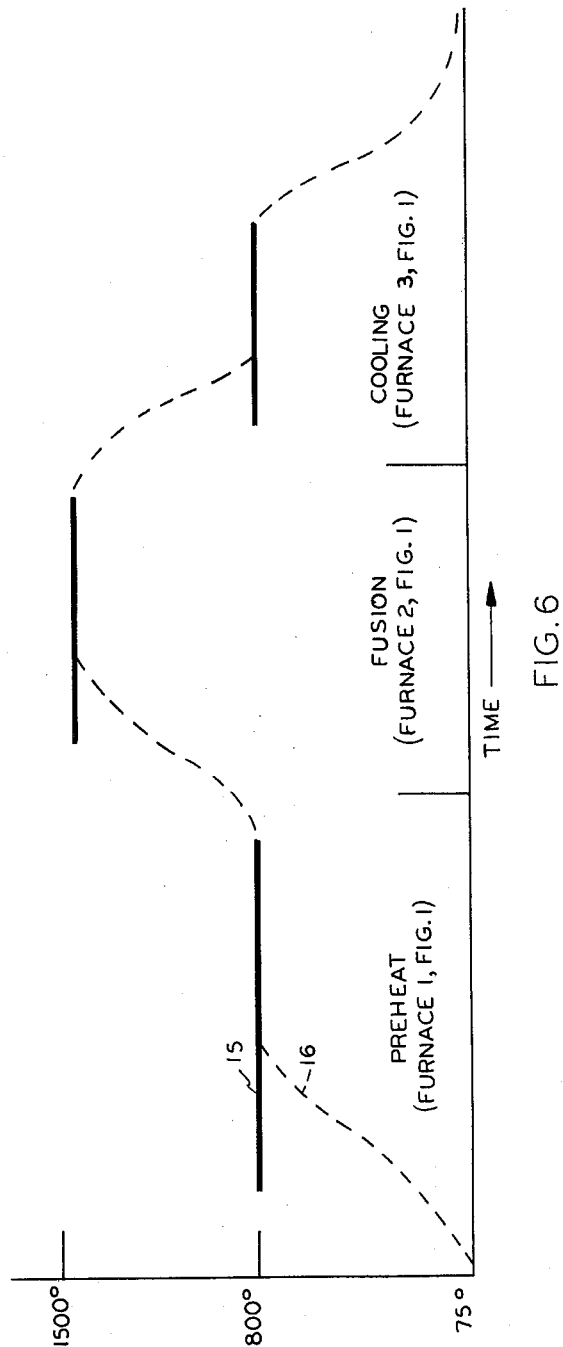
Figure 7:
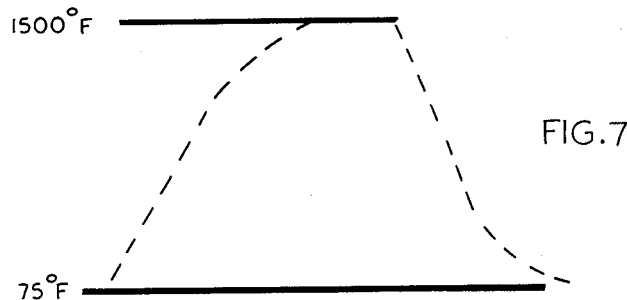
Figure 12:
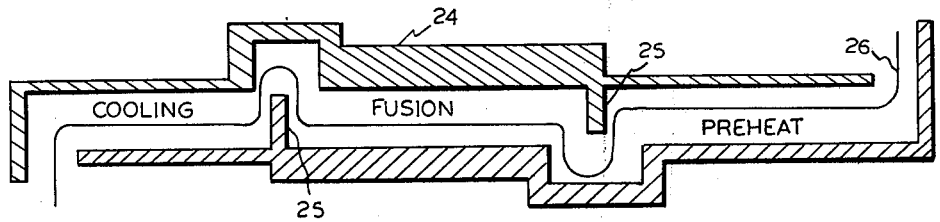
Figure 10:
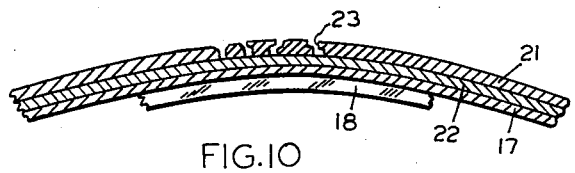
Figure 9:
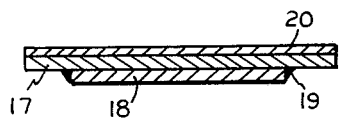
Figure 8:
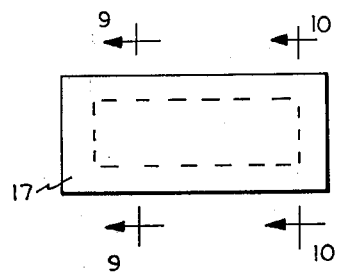
Figure 11:
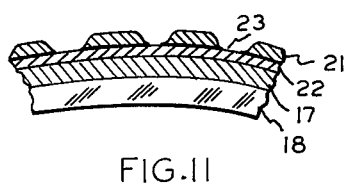

FIG. 5 exhibits temperature curves in a conventional continuous enameling furnace relating to the ambient temperature of the furnace, and the average temperature of the ware being fired;

FIG. 6 represents graphically the ambient temperature curve of my novel apparatus throughout the firing cycle of a porcelain enameled article, and the average temperature of the ware being fired throughout said firing cycle;

FIG. 7 represents the firing curve of a piece of enameled ware in a box-type periodic furnace;

FIG. 8 is a plan view of the test piece for evaluating the advantages of my novel apparatus;

FIG. 9 is a section through 9—9 of FIG. 8;
FIG. 10 is a section through 10—10 if FIG. 8;
FIG. 11 is an enlargement of a portion of FIG. 10;
FIG. 12 is a plan view of a variation of my novel apparatus.

Figure 1:
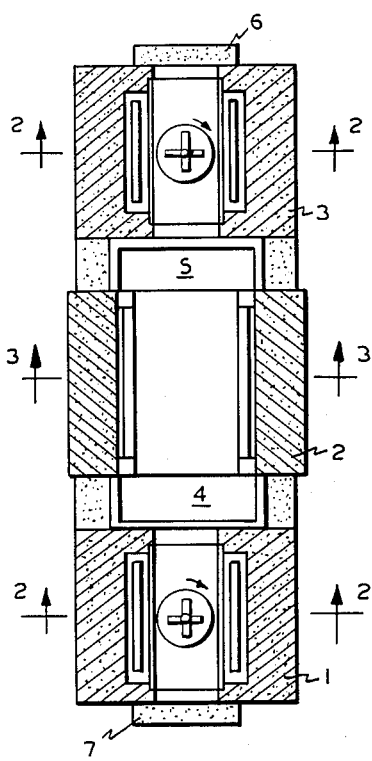

Referring now more particularly to the drawings, FIG. 1 is a plan view of a series of slightly modified, conventional laboratory box-type furnaces which have been joined end to end, with vertically slidable doors separating them, the centrally situated furnace having been modified to have both ends open.

In operation, the ware to be fired progresses from bottom to top, referring to FIG. 1, the enameled ware being held briefly in furnace 1, after which door 7 and door 4 separating furnace 1 and 2 are raised and the ware is placed in furnace 2 for a brief period, doors 7 and 4 being immediately closed. Doors 5 and 6 are then raised and the ware is taken from furnace 2 into furnace 3 for a brief period, doors 6 and 5 being immediately closed after transfering the ware from furnace 2 to 3. Door 6 is then raised and the fired ware removed from the last of the series of furnaces.

Referring now to FIGS. 8, 9, 10 and 11, FIG. 8 represents a rectangular steel plate 17, with another rectangular steel plate 18, of smaller outline, welded centrally to one side of the larger. FIG. 9 shows the two plates held together by weld 19. This special arrangement duplicates production conditions which aggravate enamel defects as will be hereinafter described.

In FIG. 9, a porcelain coating is generally represented by 20, and in FIG. 10, there is indicated an enlarged cross-section of my test plate, with exaggerated distortion thereof for purposes of illustration, with the enamel coating, indicated generally by 20 in FIG. 9, shown in more detail as comprising ground coat 22 and cover coat 21.

In practice when the test piece, coated with a fused ground coat, and a bisque cover coat, is introduced into a furnace for the purpose of firing the cover coat to fusion, the sudden intense heat of a box furnace raises the temperature of the thinner, outer web of the test piece, while the heavier central section remains relatively cool. This is sufficient to cause the expanding thin section to create a slight convex curvature in the enameled surface before the bisque cover coat has become fluid, causing minute cracks in said bisque, represented by 23 in FIG. 10. When the cover coat finally fuses, it pulls back from the ground coat as shown in FIG. 11, permitting the dark ground coat to show through the length of the fissure thus created to form an unsightly "hairline" in the finished piece.

The test piece thus duplicates on a laboratory scale the shifting and distortion of metal that takes place in firing commercial pieces arising from double thicknesses, inadequate bracing, and uneven heating due to complex contours and sheer bulk.

Figure 2:
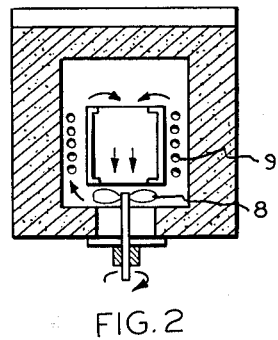
FIG. 2 is a section through 2—2 in FIG. 1.

Describing the operation in more detail, a conventionally ground coated test piece as described above, coated with a bisque titania opacified cover coat, was placed in furnace 1, on suitable refractory supports, by raising door 7 and placing said ware on said support after which door 7 was closed. The temperature of furnace 1 may be maintained anywhere from 600 to 1100° F., in the case of sheet steel enamels, the maximum of which is well below the fusion point of the cover coat to be fired. The work piece was permitted to remain in furnace 1 until such time as the temperature throughout the entire workpiece had stabilized to substantially the same constant temperature as that maintained in furnace 1. From FIG. 1 and FIG. 2, it will be seen that a small circulating rotor, suitably journaled through a heat seal at the bottom of the furnace, motivated by any suitable means not shown, acts to circulate heat within furnace 1 as an aid to achieving a constant, fixed temperature in the workpiece being processed.

Figure 3:
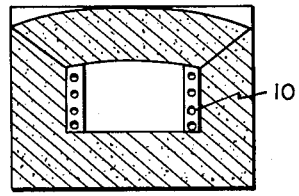
FIG. 3 is a section through 3—3 in FIG. 1.

After the workpiece was stabilized in furnace 1, doors 7 and 4, by any suitable conventional means not shown, were raised and the test piece was quickly transferred from furnace 1 to furnace 2, again resting on suitable supports, doors 4 and 7 then being quickly closed. The temperature of furnace 2 was maintained at fusion temperature and as will be seen from FIG. 3, furnace 2 is a conventional resistance element furnace normally used for laboratory work of this type. In this particular case, the workpiece was permited to stay in furnace 2 for a period sufficient to fuse a cover coat of titania opacified enamel, after which doors 5 and 6 were raised and the workpiece quickly transferred from furnace 2 to furnace 3, again being placed on suitable supports in furnace 3. As the transition was made from furnace 2 to furnace 3, doors 5 and 6 were quickly closed. The temperature in furnace 3 was maintained at the same temperature as furnace 1, and the workpiece was permitted to stay in furnace 3 for a time sufficient for all segments of it to cool to the constant, ambient temperature of furnace 3. Thus there is provided three separate and distinct zones, preheat, fusion, and cooling.

Although in my illustrated embodiment I have shown doors 4, 5, 6 and 7 encompassing the various zones, I may achieve essentially the same effect, for the purpose of maintaining a substantially constant temperature in the preheat and cooling zones, by introducing a convection current of air at the point of juncture between two adjacent zones, said air, for example, being introduced into the preheat zone adjacent the firing zone said air current having its temperature so adjusted as to counteract, by having a cooling effect thereon, of heat tending to pass from the fusion zone to said preheat zone.

After the workpiece had been stabilized to the temperature of furnace 3, it was removed and permitted to cool to room temperature. As will be seen from FIG. 2, furnace 3 is essentially a duplication of furnace 1 and acts, as furnace 1, to stabilize all parts of the workpiece enameled at a constant temperature subsequent to fusion of the bisque coating thereon. While the pre-heat and cooling temperatures may be the same, they may also vary, as to each other, so long as each is maintained fairly constant.

While, for the purposes of this disclosure, the three separate and distinct zones in my apparatus may be considered semi-periodic, it is readily apparent that a conveyor chain 26 could be routed through a continuous furnace 24 in such a manner that the three zones were effectively baffled (25) each from the other, the ware following an arcuate path around the baffle in order to effect three separate and distinct zones within the furnace wherein the preheat and cooling zones were maintained at a relatively constant temperature to effect the necessary stabilization of temperature within the workpiece preceding and following fusion. See FIG. 12. This stresses the fact that my procedure could not be effected in Dickey's furnace, or any conventional continuous furnace, because radiant and convectional heat from the hot zone pervade both the preheat and cooling sections, resulting in the undesirable temperature gradient in these zones and thereby forcing ware being fired to be preheated and cooled on the straight line ascension and descension curves, which I avoid.

Too, in lieu of the device shown in FIG. 12, or complementary thereto, convection currents could be utilized as an aid to the maintenance of a substantially constant temperature within the critical range both in the preheat and cooling zones.

Figure 4:
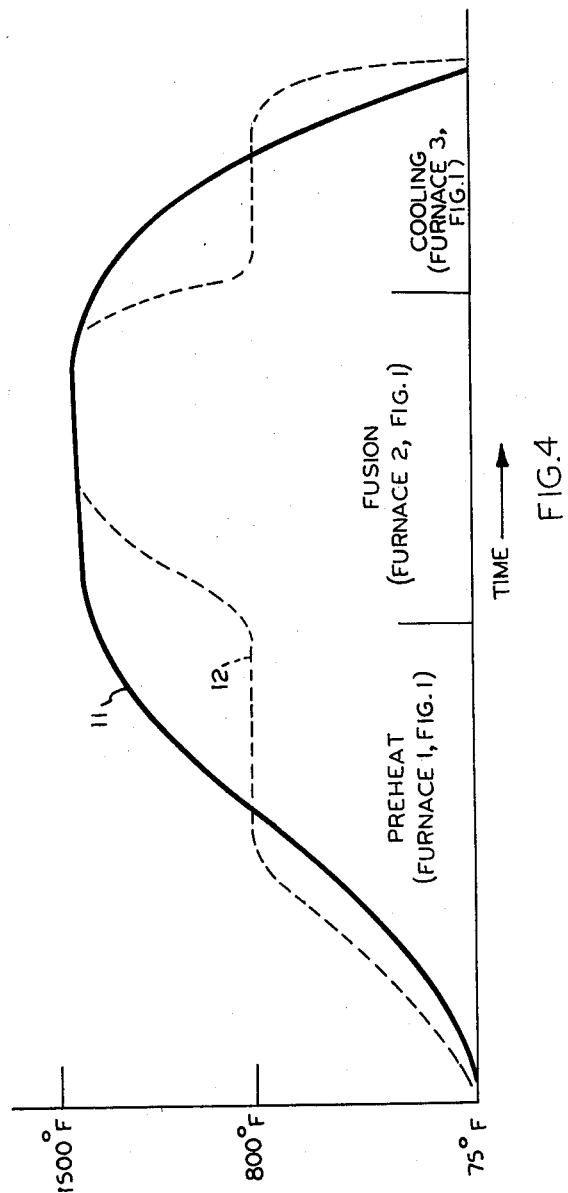
FIG. 4 represents comparative temperature curves showing ambient temperature in a conventional continuous furnace compared with the ambient temperature of my novel apparatus.

To more fully illustrate the action of my novel apparatus, attention is directed to FIG. 4, wherein is shown comparative temperature cycles of a piece of ware being enameled, from its initial, approximate room temperature of 75° F. to fusion, to final temperature, following fusion, of approximately 75° F. Solid line 11 depicts the temperature curve of a piece of ware as it progresses through a conventional continuous furnace on the order of that disclosed by Dickey. As will be seen, at no point along its temperature curve, preceding or following fusion, are there any "plateaus" during which the temperature of the entire piece has a chance to become stabilized at a fixed temperature. Solid line 11 depicts the average temperature of the article being fired in a conventional continuous furnace, which may be measured by suitable recording equipment, known in the art, which proceeds through the furnace, along with ware to be fired, and records furnace temperature at various elevations (heights) within the furnace, throughout its travel therethrough.

Dotted line 12, in FIG. 4, demonstrates the average temperature of a piece of ware fired in my novel apparatus depicted in FIG. 1. It will be seen that the temperature of the ware to be fired quickly ascends, in much the same manner as a piece of ware fired in a conventional continuous furnace, to a temperature about 800° F., but then, because of the closely controlled constant temperature of that particular zone, does not go above 800° F. and stabilizes at that temperature. When transfererd to furnace 2, shown in FIG. 1, dotted line 12 indicates that the temperature of the ware quickly ascends to fusion temperature and at this point coincides roughly with the temperature of fusion in the hot zone of a conventional continuous furnace such as Dickey's. Upon removal from furnace 2 (FIG. 1), and advancing to furnace 3 (FIG. 1), it will be seen from FIG. 4 that the temperature of the ware quickly drops, again to 800° F., and is maintained constant there until all parts of the workpiece, with its fused coating, have stabilized at 800° F., after which the piece is removed from furnace 3 (FIG. 1), and permitted to cool rapidly to room temperature.

At this point, it should be stressed that the action of my preheating and cooling treatment is not to be confused with that of an annealing lehr wherein glass articles are gradually cooled on a straight line descension curve to equalize stresses therewithin. Rather my invention consists in an interrupted preheating and cooling curve during which period there is absolutely no substantial increase, or decrease, in temperature of the workpiece, no matter how gradual; all parts of said workpiece being permitted to stabilize at a substantially constant and equal temperature throughout.

Referring to FIG. 5, there is shown the relative temperature curves of the ambient temperature of a conventional continuous furnace, and the temperature lag created thereby in a workpiece progressing therethrough. The solid line 13 illustrates generally the ambient temperature of the continuous enameling furnace, relatively speaking, at any point along its length while the dotted line 14 shows the average temperature of piece of ware at any point throughout the length of said furnace and it will be seen that, until the fusion point is reached, there is a decided lag between the temperature of the workpiece to be enameled and the ambient temperature of the furnace preceding the fusion point, while the reverse is true during the cooling cycle; that is, the temperature of the ware is higher, following fusion, than the temperature of the furnace during the period the ware is cooling. It will thus be seen that in a conventional continuous furnace, there is never provided a period during which all parts of a piece of ware may stabilize at substantially the same temperature, other than at fusion temperature. Dotted line 14 illustrates generally the average temperature of a large piece of ware, such as a bathtub, it being understood that in order to depict the temperature of several given areas of a bathtub, taken from top to bottom, or from side to side, there would probably be a series of separate dotted lines 14, all of them substantially lagging line 13 to a greater or lesser degree.

Referring to FIG. 6, solid line 15 illustrates the ambient temperatures of the three zones depicted by furnaces 1 through 3 in FIG. 1, and the corresponding zones in FIG. 12. As the various doors separating the individual furnaces are opened, and as ware passes from one zone to another in the furnace in FIG. 12, there is a very narrow area during which there is an extremely rapid increase or decrease of ambient temperature. Solid line 15 illustrates the ambient temperatures of the respective furnaces. As will be seen by dotted line 16, representing the average temperature of a piece of ware being fired according to my apparatus, there is the usual temperature lag and straight line ascension as the temperature of the ware achieves that of the preheat furnace No. 1, shown in FIG. 1. And the essence of my invention is illustrated by the fact that there is provided ample time before and/or following fusion, for the average temperature throughout the entire workpiece to become stabilized and coincident with the ambient temperature of that particular zone's atmosphere, represented by the period during which lines 15 and 16 are substantially coincident in the preheat and cooling zones. As will be apparent, at any point along this length of coincidence, all segments of a complex workpiece would achieve substantially the same temperature, and would coincide substantially with the constant ambient temperature of the preheat zone. Proceeding then to the fusion zone, or furnace 2 as depicted in FIG. 1, we see there is an abrupt increase in temperature from the preheat temperature to the fusion temperature, with the usual lag in the temperature of the workpiece, and a more or less stable condition being reached at the maximum temperature of the fusion zone, during which fusion of the ceramic coating takes place. Following fusion, there is a sudden drop in the ambient temperature from fusion temperature to cooling zone temperature, the straight line descension of the temperature of the workpiece with its fused coating to the ambient temperature of furnace 3 taking place as shown in FIG. 1, in the cooling zone, wherein again there is a period during which the temperature of the workpiece to be cooled is coincident with the constant temperature of the cooling zone. All parts of the workpiece with its fused coating, during cooling, become equalized and stabilized at the ambient temperature of the final zone. Following removal from the last furnace, there is the abrupt drop to room temperature of the finished piece with its fused coating.

FIG. 7 illustrates the extremely severe conditions of firing imposed upon a workpiece to have fused thereon a vitreous coating when it is introduced directly into a box-type periodic furnace having an ambient temperature in the fusion range, when the workpiece is at room temperature. The increase in temperature is extremely abrupt resulting in extremely rapid increase and subsequent decrease in temperature directly to and from the fusion temperature, with an attendant wide variation in temperature between certain parts of the workpiece, such as between the surface of the vitreous coating, and the surface of the underlying base metal surface; and between the surface of said underlying base metal and a center point in the cross-section of said base metal piece. This would obviously tend to aggravate any tendency on the part of the base metal piece to flex or warp during the firing cycle, causing the difficulties discussed above.

As previously emphasized, one of the advantages of my invention is the possibility of using lighter gauge steel and less bracing for a given part to be enameled inasmuch as many of the stresses which previously caused enamel failure are eliminated by my invention. I have found that at some point between 600° F. and 1100° F., depending upon the design of the ware being enameled, metal gauge, etc., there is the greatest tendency for certain parts of the piece to flex, ever so slightly, with respect to others, due to expansion of some parts which have heated more rapidly than others. When this happens, the fragile bisque coating, as yet unfused, develops tiny cracks which penetrate all the way down to the base coating, which, when the temperature of fusion is eventually reached, through surface tension of the enamel, causes the enamel to literally peel back or "crawl" away from the area of the fracture, revealing the darker undercoating, and permitting same to penetrate, to some extent into the crack in the bisque coating upon fusing. This situation is manifest in the finished fired piece by a defect known as "hairlines" or "crawling," hereinafter referred to as "strain lines," caused by the unsightly appearance of the darker undercoating showing through the white covercoat. However, if the enameled workpiece is maintained temporarily at a constant unvarying temperature in the critical range of 600° to 1100° F., and is permitted to stabilize throughout its entire mass at this temperature, it is found that sudden exposure of such stabilized workpiece to fusion temperatures, results in practically no distortion or warpage of the workpiece, with the expected reduction in this particular type defect.

In order to demonstrate the superiority of my novel apparatus and method over a conventional periodic box furnace, and over a conventional continuous furnace, six example test plates as previously described, were coated with a conventional ground coat, said ground coat fired at 1500° F. for a period of five minutes, using the same procedures, respectively, for those ground coated sheets later to be cover coated, as described below for firing the final cover coat. The ground coated pieces were then coated on their flat side only with a conventional white, titania-opacified enamel by the well known wet process, which was dried to the bisque state.

Two cover coated test pieces were placed in a conventional box furnace at a temperature of 1450° F. for five minutes, two were run through a continuous furnace having a temperature curve substantially represented by the solid line 13 of FIG. 5 over a period of approximately five minutes and two were run through my apparatus shown in FIG. 1, being held in frunace 1 @ 800° F. for 3¼ minutes, in furnace 2 @ 1450° F. for five minutes, followed by furnace 3 @ 800° F. for 3¼ minutes.

Results of the foregoing: The pieces fired in the conventional box furnace exhibited numerous and severe strain lines in the fused white cover coat with the darker ground coat clearly visible; the test pieces from the continuous fire (conventional type) also showed severe strain lining, only slightly better than the box furnace test pieces. By comparison, the test pieces fired in my apparatus showed absolutely no evidence of strainlining, displaying a smooth, glossy, unbroken cover coat of white; too, the test plates fired in my novel apparatus displayed a true, straight peripheral edge, whereas the test plates fired using conventional methods showed a distinct, distorted waviness along the plate edges.

Thus, it will be seen that a stabilized preheat condition at a temperature between about 600° F. and 1100° F., below the fusion temperature of the enamel, is highly effective in eliminating strain lines in a vitreous enameled cover coat. The importance of a controlled, stabilized coling step is of most importance in the ground coat firing, preceding application of the cover coat because minimizing excessive flexure of a workpiece during stabilized cooling of the ground coat, provides a fired piece, in ground coat, that is dimensionally ture when cooled, which consequently has less tendency to distort and shift during subsequent cover coat firing operations.

While we have found that an 800° F. preheat and/or cooling stabilization provides optimum results, it is to be understood that this temperature may be varied upwardly or downwardly within the range of 600° or 1100° F., such variation being dependent upon the size and bulk of the workpiece being enameled and the enamel system being employed, i.e., ultimate temperature of fusibility, rate of fusion, etc.

Furthermore, as extremely low temperature, soft enamels in the range of 1000° F. are becoming popular, the preheat and/or cooling temperature would obviously have to be kept below 1000° F. since the fusion temperature of the enamel obviously could not be exceeded and still realize the benefits of my invention.

Accordingly, having thus disclosed the essence of my invention in the foregoing disclosure by way of illustration but which is in no way to be considered a limitation upon the innumerable ramifications inherent in, and embraced within the scope of my invention, I point out and distinctly claim:

1. A method of firing a porcelain enamel coating on a workpiece comprising the steps of exposing said workpiece having disposed thereon an unfused coating of porcelain enamel, to an ambient temperature atmosphere in a first zone while maintaining said ambient temperature substantially constant above 600° F. and below the fusion point of said enamel, stabilizing the mass of said workpiece and said enamel at substantially said ambient temperature, moving said workpiece, without substantially lowering aforesaid temperature thereof, from said first zone to a second zone, said second zone having an ambient temperature above the fusion point of said enamel, and maintaining said workpiece in said second zone sufficiently long to fuse said enamel on said workpiece; removing said workpiece from said second zone and permitting same to cool, to provide a workpiece having fused thereon a vitreous enamel coating.

2. The method of claim 1 wherein the ambient temperature of said first zone is between about 600° F. and 1100° F.

3. The method of claim 1 wherein the temperature of said first zone is maintained between 600° F. and 1000° F., and the temperature of said second zone is between 1250° F. and 1650° F.

4. An article produced by the method of claim 1.

5. A method of firing a porcelain coating comprising the steps of exposing a workpiece having disposed thereon an unfused coating of vitreous enamel to an atmosphere in a first zone having a substantially constant ambient temperature above 600° F. and below the fusion point of said enamel, stabilizing the mass of said workpiece and said enamel at substantially said ambient temperature, moving said workpiece, without substantially lowering aforesaid temperature thereof, from said first zone to a second zone, said second zone having an ambient temperature above the fusion point of said enamel, maintaining said workpiece in said second zone sufficiently long to fuse said enamel on said workpiece, moving said workpiece to a third zone, having an ambient temperature above 600° F. but below the fusion point of said enamel, stabilizing the mass of said workpiece and said fused enamel thereon to substantially said ambient temperature of said third zone, and, after said workpiece has been stabilized at the temperature of said third zone, removing said workpiece from said third zone and dropping the temperature thereof to below 600° F. to provide a porcelain enameled article.

6. The method of claim 5 wherein the temperature of said first and third zones are maintained between approximately 600° F. and 1100° F.

7. The method of claim 5 wherein the temperatures of said first and third zones are between approximately 600° F. and 1000° F., and the temperature of said second zone is between 1250° F. and 1650° F.

8. A method of firing a porcelain enamel coating on a workpiece comprising the steps of exposing said workpiece having disposed thereon an unfused coating of porcelain enamel, to an ambient temperature atmosphere in a fusion zone, said temperature being higher than the fusion point of said enamel, maintaining said workpiece in said fusion zone long enough to fuse said enamel on said workpiece, moving said workpiece to a cooling zone having an ambient temperature below the fusion point of said enamel but above 600° F., stabilizing the mass of said workpiece and said fused enamel thereon to substantially said ambient temperature of said cooling zone, and, after said workpiece has been stabilized at the temperature of said cooling zone, removing said workpiece from said cooling zone and dropping the temperature thereof to below 600° F. to provide a porcelain enameled article.

9. The method of claim 8 wherein the temperature of said cooling zone is between about 600° F. and 1100° F.

10. The method of claim 8 wherein the temperature of said fusion zone is between about 1250° F. to about 1650° F., and the temperature of said cooling zone is between about 600° F. to about 1000° F.

References Cited by the Examiner

UNITED STATES PATENTS

| | | | |
|---|---|---|---|
| 1,919,136 | 7/1933 | Smith | 117—129 X |
| 2,259,935 | 10/1941 | Johnson. | |
| 2,572,702 | 10/1951 | Davis | 117—119.2 |
| 2,680,085 | 6/1954 | Raeuber et al. | 117—129 X |
| 2,757,105 | 7/1956 | Terry | 117—129 X |

MURRAY KATZ, *Primary Examiner.*

RALPH S. KENDALL, *Examiner.*